US010724657B2

(12) United States Patent
O'Brien

(10) Patent No.: US 10,724,657 B2
(45) Date of Patent: Jul. 28, 2020

(54) CABLE CARRIER GUIDE

(71) Applicant: Dynatect Manufacturing, Inc., New Berlin, WI (US)

(72) Inventor: Jay O'Brien, Valparaiso, IN (US)

(73) Assignee: Dynatect Manufacturing, Inc., New Berlin, WI (US)

( * ) Notice: Subject to any disclaimer, the term of this patent is extended or adjusted under 35 U.S.C. 154(b) by 0 days.

(21) Appl. No.: 16/242,711

(22) Filed: Jan. 8, 2019

(65) Prior Publication Data

US 2019/0145552 A1    May 16, 2019

Related U.S. Application Data

(60) Provisional application No. 61/614,896, filed on Jan. 8, 2018.

(51) Int. Cl.
| | |
|---|---|
| F16L 3/26 | (2006.01) |
| A63B 71/00 | (2006.01) |
| F16L 3/015 | (2006.01) |
| F16G 13/16 | (2006.01) |
| H02G 3/04 | (2006.01) |
| F16L 3/18 | (2006.01) |
| F16L 3/23 | (2006.01) |
| H02G 11/00 | (2006.01) |

(52) U.S. Cl.
CPC ............ *F16L 3/26* (2013.01); *A63B 71/00* (2013.01); *F16G 13/16* (2013.01); *F16L 3/015* (2013.01); *F16L 3/18* (2013.01); *F16L 3/23* (2013.01); *H02G 3/0475* (2013.01); *H02G 11/00* (2013.01)

(58) Field of Classification Search
CPC ..... H02G 3/0475; H02G 11/006; F16L 3/015; F16L 3/18; F16L 3/26; F16G 13/16
See application file for complete search history.

(56) References Cited

U.S. PATENT DOCUMENTS

| | | | |
|---|---|---|---|
| 3,219,317 A | 11/1965 | Merker | |
| 3,994,373 A | 11/1976 | Loos | |
| 4,129,277 A | 12/1978 | Tenniswood | |
| 4,462,565 A | 7/1984 | Johnson | |
| 4,600,817 A | 7/1986 | Hackenberg | |
| 5,271,585 A | 12/1993 | Zetena, Jr. | |
| 5,649,415 A | 7/1997 | Pea | |
| 6,997,412 B2 * | 2/2006 | Komiya | F16G 13/16 242/615.2 |
| 7,119,273 B2 | 10/2006 | Komiya | |
| 7,234,292 B1 | 6/2007 | O'Rourke | |
| 7,310,935 B2 | 12/2007 | Worms | |
| 8,151,956 B2 | 4/2012 | Wehler | |
| 8,575,486 B2 | 11/2013 | Jaeker et al. | |
| 9,722,402 B2 * | 8/2017 | O'Brien | H02G 3/0475 |
| 2002/0117523 A1 * | 8/2002 | Ketterhagen | B60R 9/042 224/310 |

(Continued)

*Primary Examiner* — Eret C McNichols
(74) *Attorney, Agent, or Firm* — Andrew Landsman; Godfrey & Kahn, s.c.

(57) ABSTRACT

A long travel cable carrier guide has a plurality of guideposts that support an upper portion of a cable carrier. The plurality of guideposts include rollers that move between an extended and retracted position that allows the cable carrier to pass by the guideposts. The rollers automatically return to an extended position wherein the rollers protrude into the path of the cable carrier and provide support to the upper portion of the cable carrier as needed.

11 Claims, 14 Drawing Sheets

(56) References Cited

U.S. PATENT DOCUMENTS

2010/0050589 A1* 3/2010 Komiya ............... F16G 13/16
                                              59/78.1
2011/0061313 A1    3/2011  Vos
2015/0096952 A1    4/2015  Hall
2015/0322733 A1   11/2015  Wells, Sr.

* cited by examiner

CABLE CARRIER GUIDE

CROSS REFERENCE TO RELATED APPLICATION

This application is based on and claims priority to U.S. Provisional Patent Application No. 61/614,896 filed on Jan. 8, 2018, which is incorporated herein by reference in its entirety for all purposes.

FIELD OF THE INVENTION

The present invention relates generally to the field of cable carriers. More particularly, the present invention relates to a guide for a cable carrier where an upper portion of the cable carrier is supported.

BACKGROUND

In the field of cable carriers, especially long travel cable carriers, there is a need to provide support and guidance to the cable carrier to ensure consistent movement of the cable carrier. Cable carriers, also known as drag chains, energy chains, or cable chains, are guides that surround and guide flexible cables and/or hoses that are connected to moving parts of a larger machine. Cable carriers reduce wear and stress on the flexible cables and hoses, prevent entanglement, and improve operator safety by bundling multiple cables together.

Typical cable carriers have a rectangular cross section, inside of which the cables travel, and include a plurality of sections that are rotatably attached to each other to form a length of cable carrier. More or fewer sections may be included in the cable carrier to accommodate cables of any length. Cable carriers come in a wide variety of sizes, depending on the application and number of cables carried by the carrier.

The primary benefit of using a cable carrier is to keep cables organized, separated, and protected in applications where the cable must move relative to the machinery to which it is attached. Some common non-exhaustive examples of where cable carriers are used are automated car washes, elevators, cranes, vending machines, and machine tools. A cable carrier can be used to guide and protect cables in any machine that has a movable part connected to a power source and/or control board.

In applications where the cable carrier travels a long horizontal distance, it may be necessary to support the cable carrier with a cable carrier guide to prevent damage to the cable carrier and to ensure efficient, low friction operation of the cable carrier. In particular, if the cable carrier travels a long horizontal distance and has a lower anchor point and an upper section that moves in relation to the lower anchor point, gravity causes the upper section to droop, and if the distance is long enough the upper section may droop so far that it contacts the lower section.

Existing solutions to this problem have included a plurality of guideposts with rollers that rotate between a resting position and an engaged position. When the rollers are in the resting position, the cable carrier can be supported by the rollers. However, when the cable carrier passes the guidepost, it engages the roller such that it rotates out of the way of the cable carrier. Such existing solutions are somewhat effective, but the rotational movement of the roller sometimes results in jamming or ineffective support of the cable carrier guide, particularly if the roller does not rotate from the engaged position to the resting position quickly enough. Furthermore, the rotational mechanism is complex and the manufacturing of the mechanism is expensive and maintenance can be difficult.

As such, there is a need for a modular, low friction guide that supports the upper section of the cable guide, but is low cost, easy to assemble, and eliminates the rotational movement of the roller.

SUMMARY

The present invention relates to a guide for a cable carrier that travels along a path, the cable carrier having an upper portion, a middle portion, and a lower portion. The cable carrier guide includes a plurality of guideposts positioned on either side of the path. Each of the guideposts includes a support assembly including at least one support roller. The support roller is slidably attached to the support assembly such that it moves between an extended and a retracted position. The support roller is biased toward the extended position such that it can provide support to the upper portion of the cable carrier as it is needed.

The support assembly also includes a plurality of bumpers positioned near the support roller. The bumpers are rotatably attached to the support assembly such that when the cable carrier approaches the guidepost, the middle portion engages at least one bumper, thereby causing the roller to temporarily move to the retracted position while the middle portion is engaged with the bumper and allowing the middle portion to pass by the guidepost.

It will be understood by those skilled in the art that one or more aspects of this invention can meet certain objectives, while one or more other aspects can lead to certain other objectives. Other objects, features, benefits and advantages of the present invention will be apparent in this summary and descriptions of the disclosed embodiment, and will be readily apparent to those skilled in the art. Such objects, features, benefits and advantages will be apparent from the above as taken in conjunction with the accompanying figures and all reasonable inferences to be drawn therefrom.

DETAILED DESCRIPTION

Figure 1:
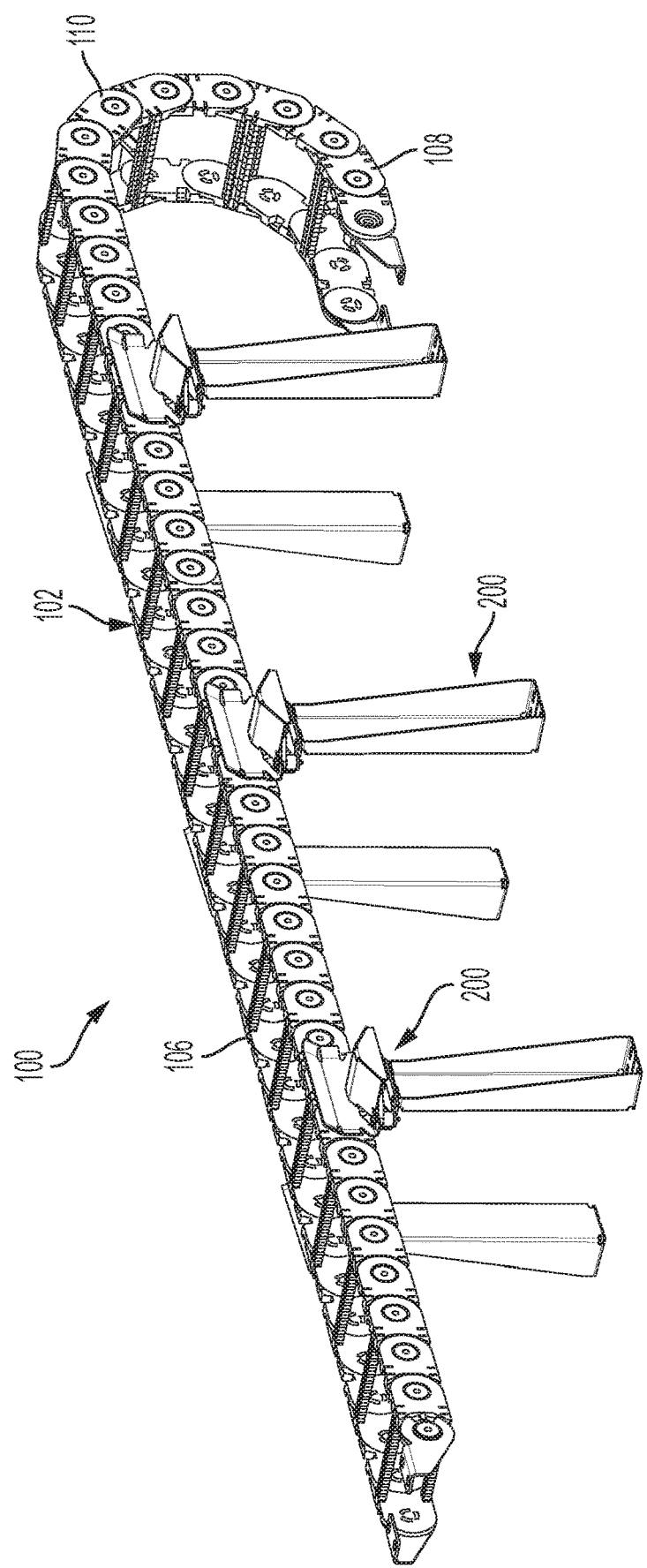
FIG. 1 is a perspective view of one embodiment of a prior art long travel cable carrier guide.
Figure 2:
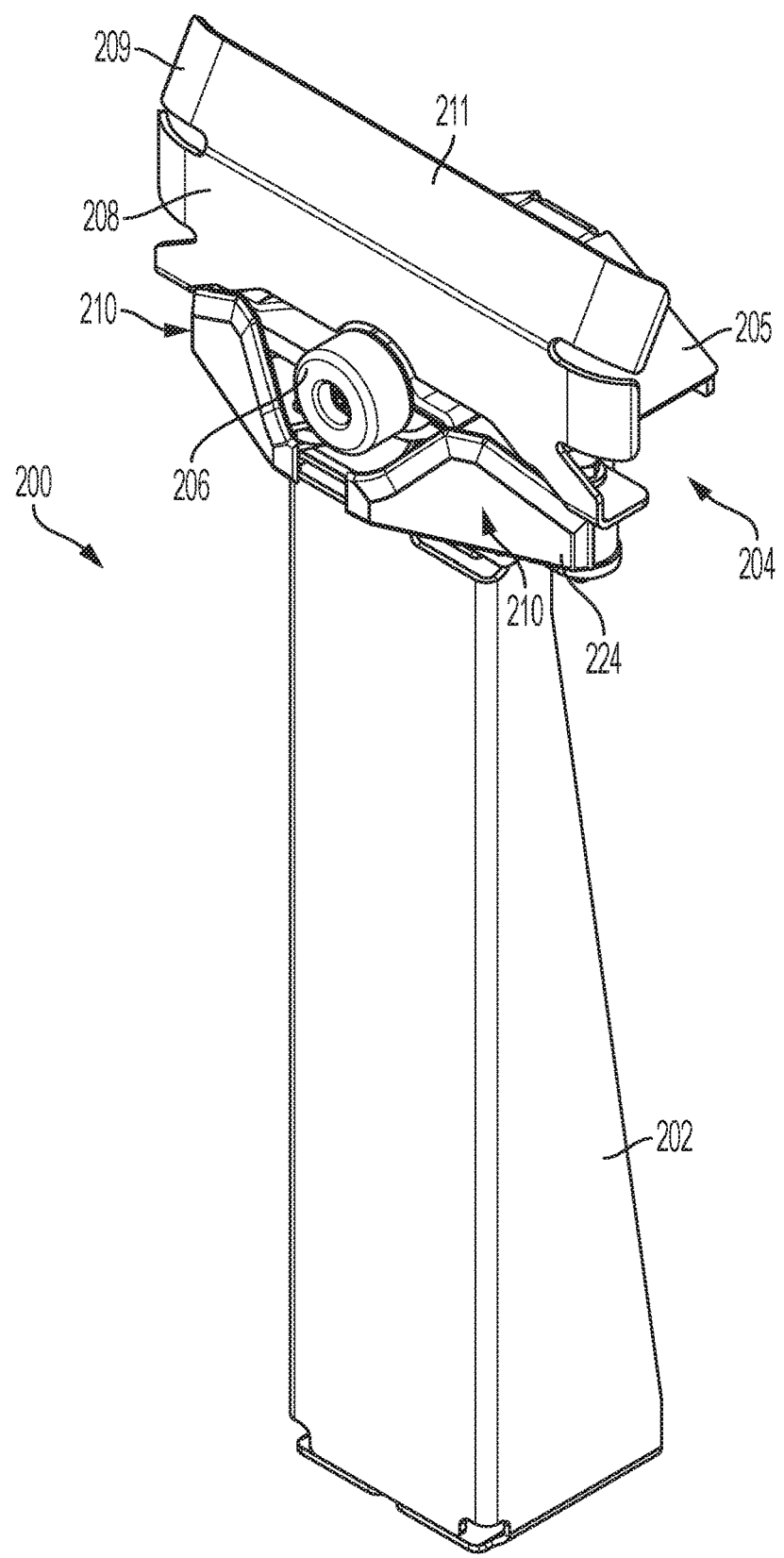
FIG. 2 is a perspective view of one embodiment of a long travel cable carrier guide in accordance with the invention showing a support roller in an extended position.

Referring to FIG. 1, one embodiment of a long travel cable carrier guide 100 in accordance with the invention is shown. The long travel cable carrier guide 100 includes a plurality of guideposts 200 that are positioned along the length of the path of travel of cable carrier 102. Cable carrier 102 includes a plurality of sections 104 that are rotatably and removably attached to each other to create a chain that can articulate. Cable carrier 100 has an upper portion 106 and a lower portion 108. The lower portion 108 is anchored to a base such as a floor. Upper portion 106 is attached to a movable part, such as a component of a machine (not shown).

Upper portion 106 and lower portion 108 are connected to each other by a curved middle portion 110. The curved middle portion 110 has a consistent geometry based on the configuration of the sections 104 that only allow the curved middle portion to have a curvature that does not overbend the cables. As cable carrier 102 travels along a horizontal path 105, the cable carrier has more or less of an upper portion 106, and more or less of a lower portion 108, depending on the position of the cable carrier. As shown, the long travel cable carrier guide 100 of the present invention includes a plurality of guideposts 200 positioned along the length of the path of travel of the cable carrier 102. Although guideposts 200 are shown positioned directly across from each other on either side of cable carrier 102, the guideposts may alternatively be positioned in any suitable arrangement without departing from the invention, e.g., offset in position.

Turning now to FIGS. 2-14, one embodiment of a guidepost 200 for a long travel cable carrier guide 100 in accordance with the invention is shown in greater detail. As shown, each guidepost 200 includes a base 202, a support assembly 204, and a protective cover 205. As shown, base 202 serves the purpose of positioning support assembly 204 a desired distance from the floor. In the embodiment shown, base 202 is essentially a folded sheet metal box, but any suitable support may be used without departing from the invention. Some non-limiting examples of alternative bases include a cylindrical post, or injection molded non-metallic material for use in corrosive environments.

In the embodiment shown, the support assembly 204 includes a roller 206, a vertical guide 208, and two bumpers 210. Roller 206 supports the upper portion 106, and the vertical guide 208 guides the upper portion to maintain its position relative to the lower portion 108. The bumpers 210 serve the dual purpose of protecting the roller 206 and causing the roller to retract to a retracted position when either bumper is contacted by the cable carrier 102. Although one roller 206 is shown, a plurality of rollers may alternatively be used without departing from the invention.

Figure 3:
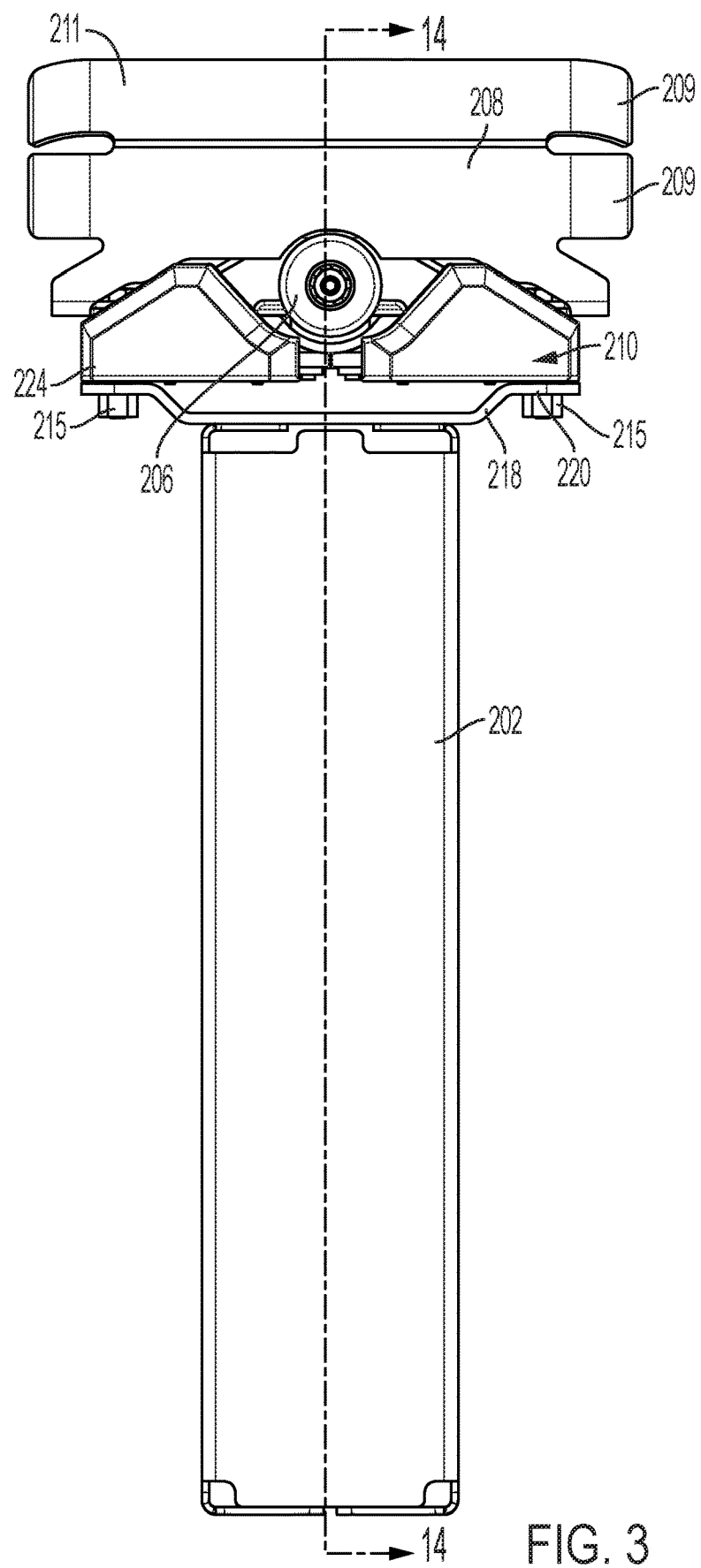
FIG. 3 is a front view of the long travel cable carrier guide of FIG. 2.
Figure 4:
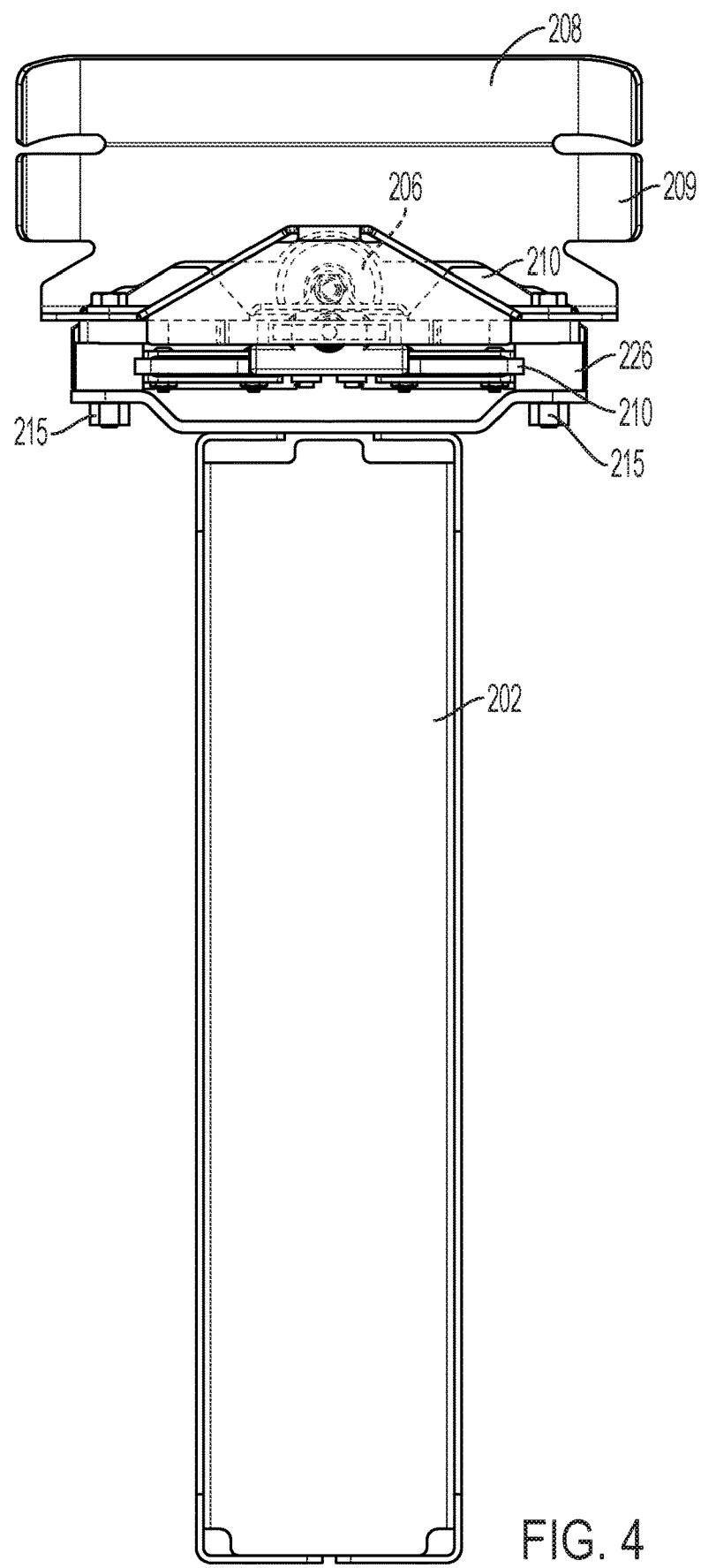
FIG. 4 is a back view of the long travel cable carrier guide of FIG. 2.
Figure 5:
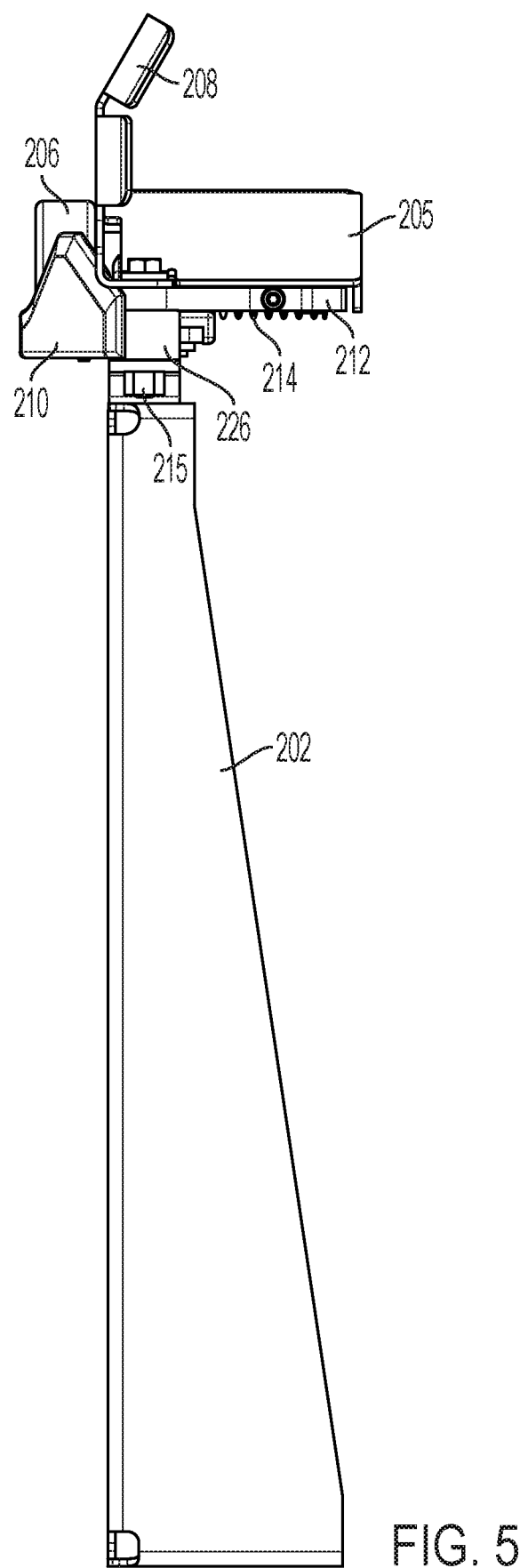
FIG. 5 is side view of the long travel cable carrier guide of FIG. 2.
Figure 6:
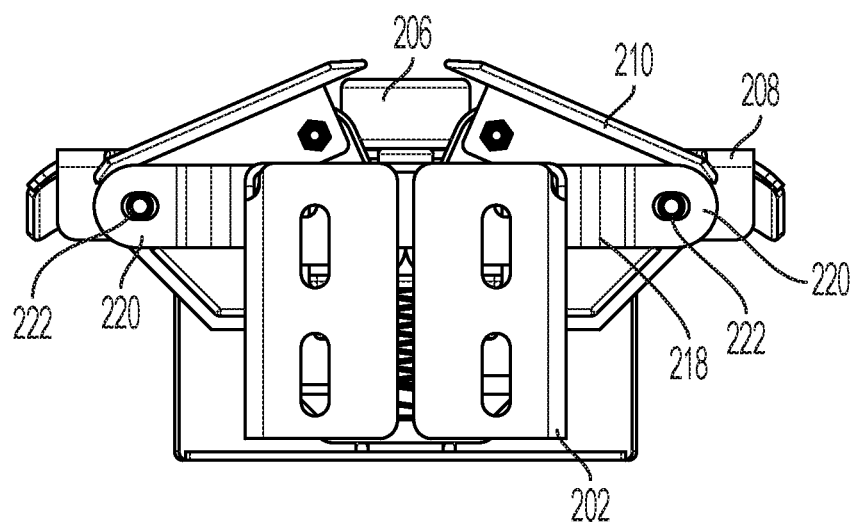
FIG. 6 is a bottom view of the long travel cable carrier guide of FIG. 2.

Turning to FIG. 3, support assembly 204 further includes a mounting bracket 218, which is removably attached to base 202. Of course, in alternative embodiments, mounting bracket 218 could be integrally formed into base 202 without departing from the invention. As shown in FIG. 6, mounting bracket 218 has two ends 220 and further includes attachment holes 222 near each end.

Figure 7:
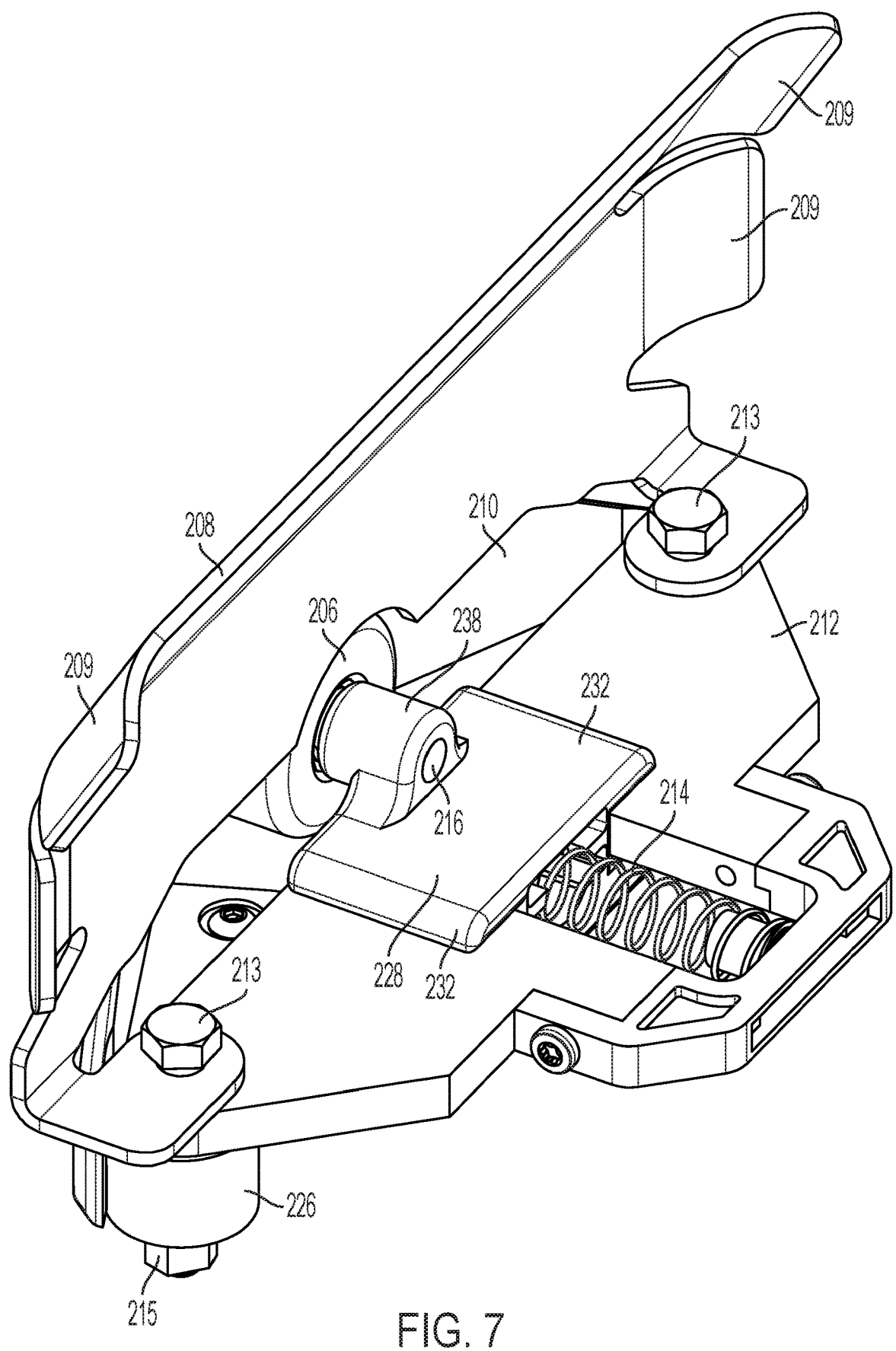
FIG. 7 is another perspective view of the long travel cable carrier guide of FIG. 2 showing the top rear of a support portion in the extended position and with a protective cover removed.

Referring back to FIG. 3, the bumpers 210 are mounted immediately above mounting bracket 218 and are positioned on either side of roller 206. As shown in FIG. 7, each bumper 210 includes a substantially flat bumper pad 224 facing the path 105. In the embodiment shown, bumper pad 224 is a wear item and is easily replaced. In alternative embodiments, however, bumper pad 224 may be integrally formed into the bumper 210 without departing from the invention. Each bumper 210 includes a bushing 226 at a first end, which is positioned above mounting bracket 218 and which further provides an axis of rotation around which bumper may rotate. A second end 229 of bumper 210 is movably attached to a slot 240 in bearing block 228, such that rotation of bumper around the axis causes the second end 229 to translate linearly in a direction perpendicular to path 105. In the embodiment shown, each bumper 210 may move independently, but the bumpers could alternatively be linked without departing from the invention.

Bearing block 228 includes a main portion 230, two upper flanges 232 and two lower flanges 234. The upper and lower flanges 232, 234 form channels on either side of the bearing block 228 through which portions of support base 212 pass to guide the movement of the bearing block described above. Bearing block 228 further includes a bearing 216 inserted into a bearing housing 238. In the embodiment shown, bearing housing 238 is integrally formed into bearing block 228, but any suitable bearing housing, such as a pillow block, may be used without departing from the invention. Finally, bearing block 228 includes a slot 240 into which the second ends 229 of the bumpers 210 may slide, causing the bearing block 228 to move from an extended position and a retracted position.

Figure 14:
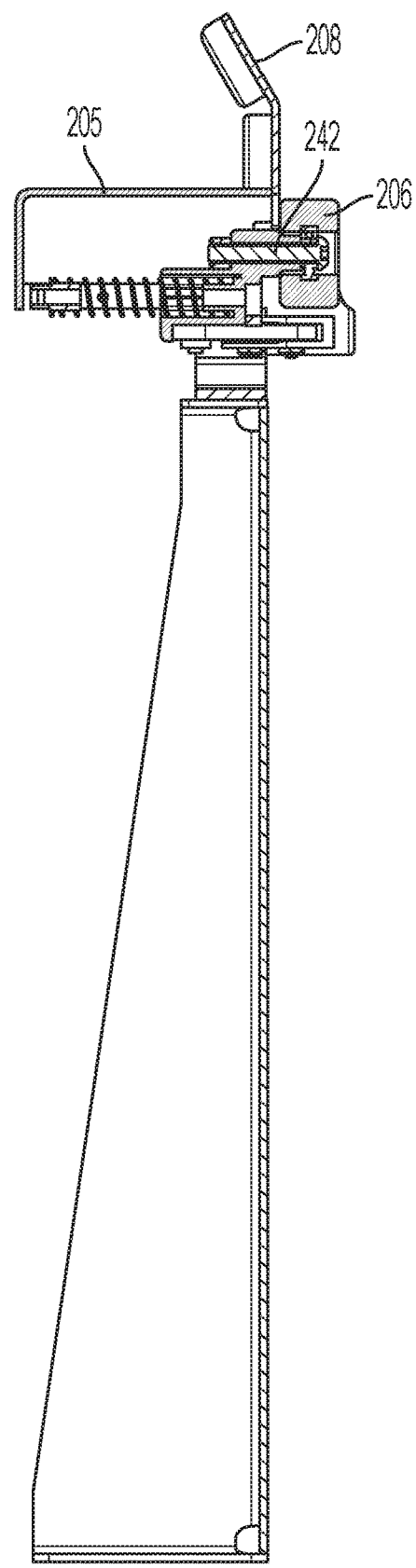
FIG. 14 is a section view of the long travel cable carrier guide of FIG. 2 taken generally along the line 14-14 in FIG. 3.

As shown in FIG. 14, roller 206 is attached to an axle 242. Axle 242 is rotatably attached to the bearing 236, which is disposed in the bearing block 228. As shown, roller 206 can freely rotate. In addition to causing the displacement of roller 206, the bumpers 210 protect roller 206 and is protected by bumpers 210 that the curved middle portion 110 contacts as the cable carrier 102 passes by the guidepost 200.

Figure 8:
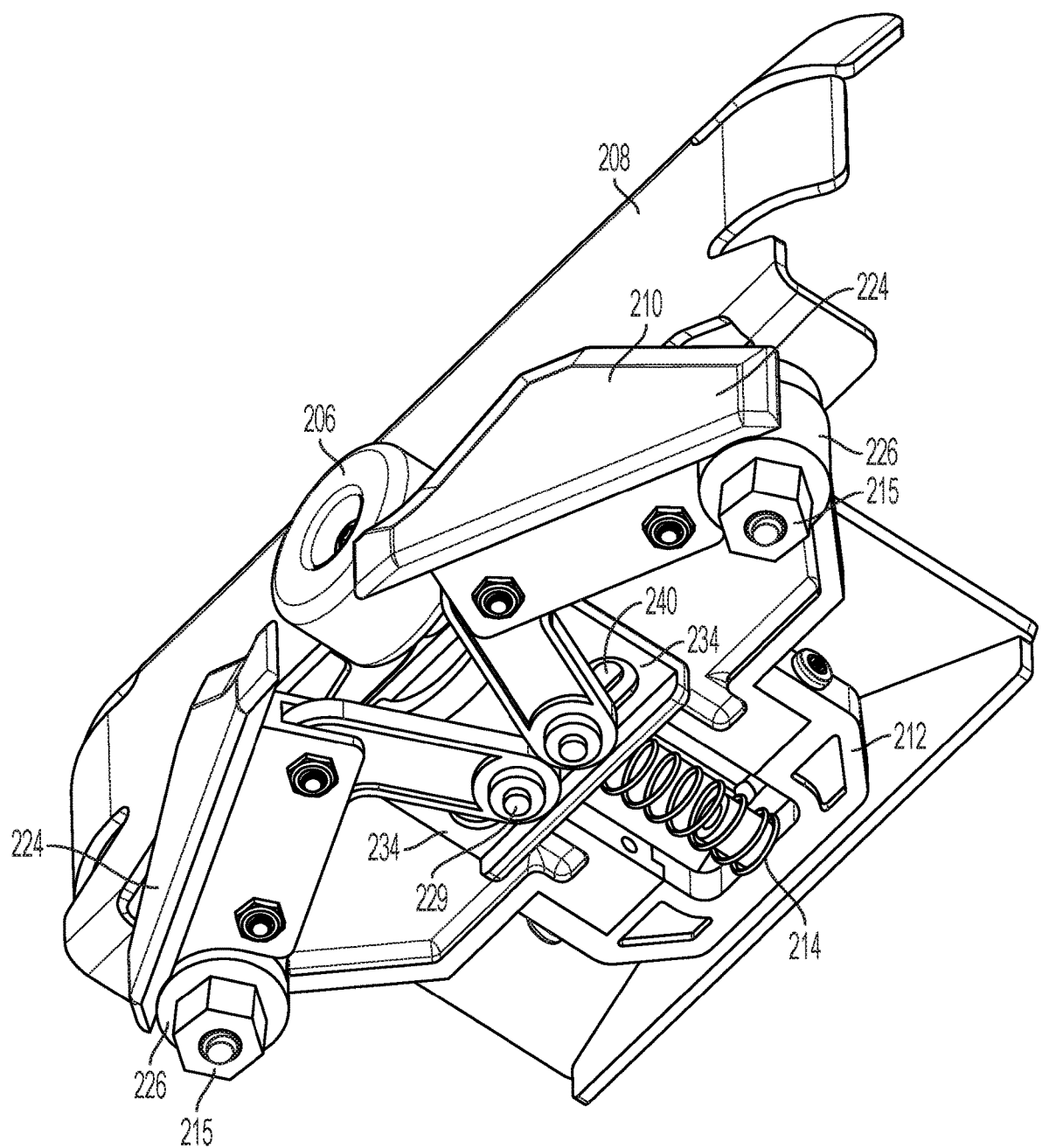
FIG. 8 is another perspective view of the long travel cable carrier guide of FIG. 2 showing the bottom rear of a support portion in the extended position with the support base removed.
Figure 9:
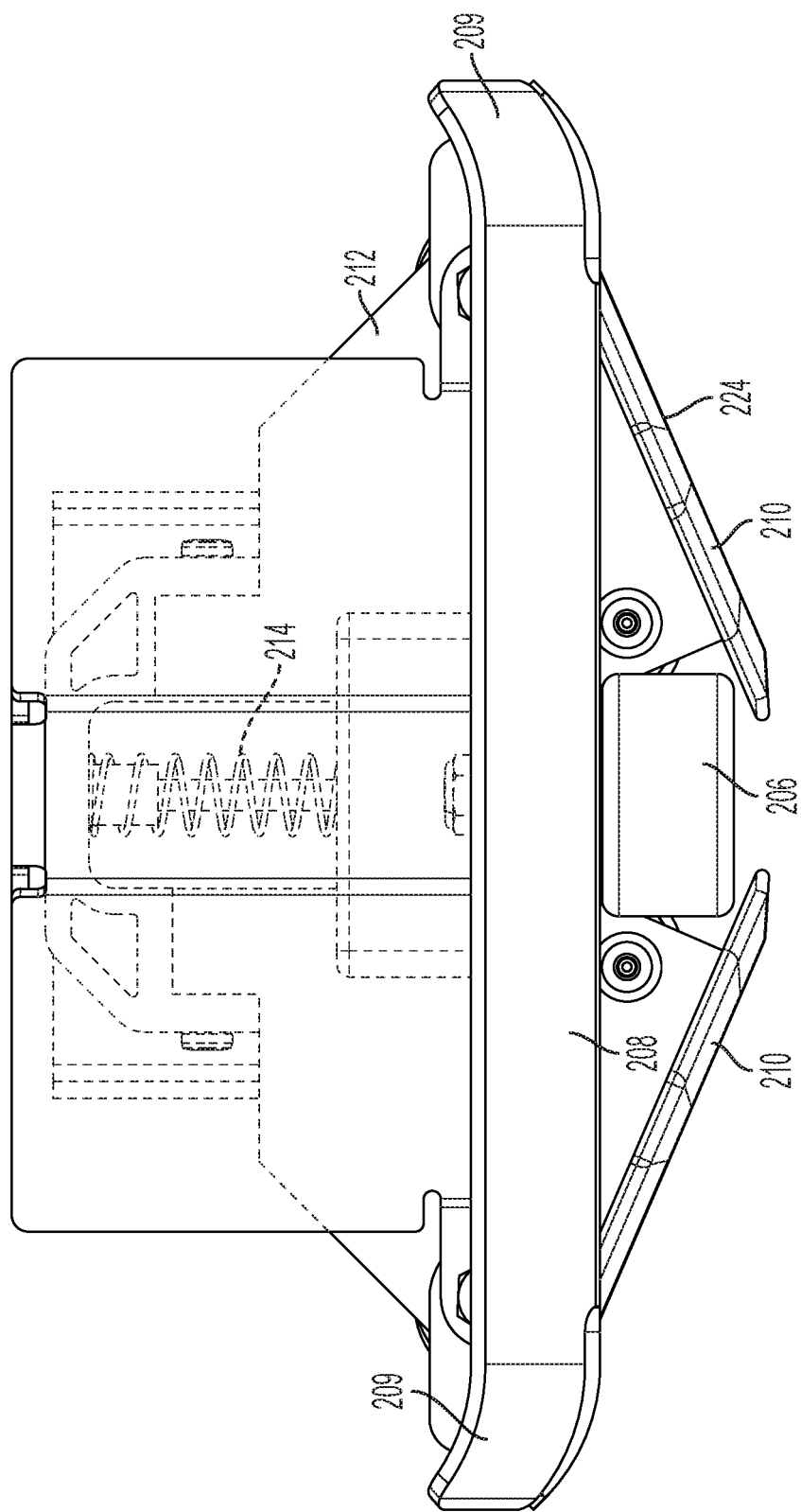
FIG. 9 is a top view of the long travel cable carrier guide of FIG. 2 showing the rear of a support portion in the extended position.
Figure 10:
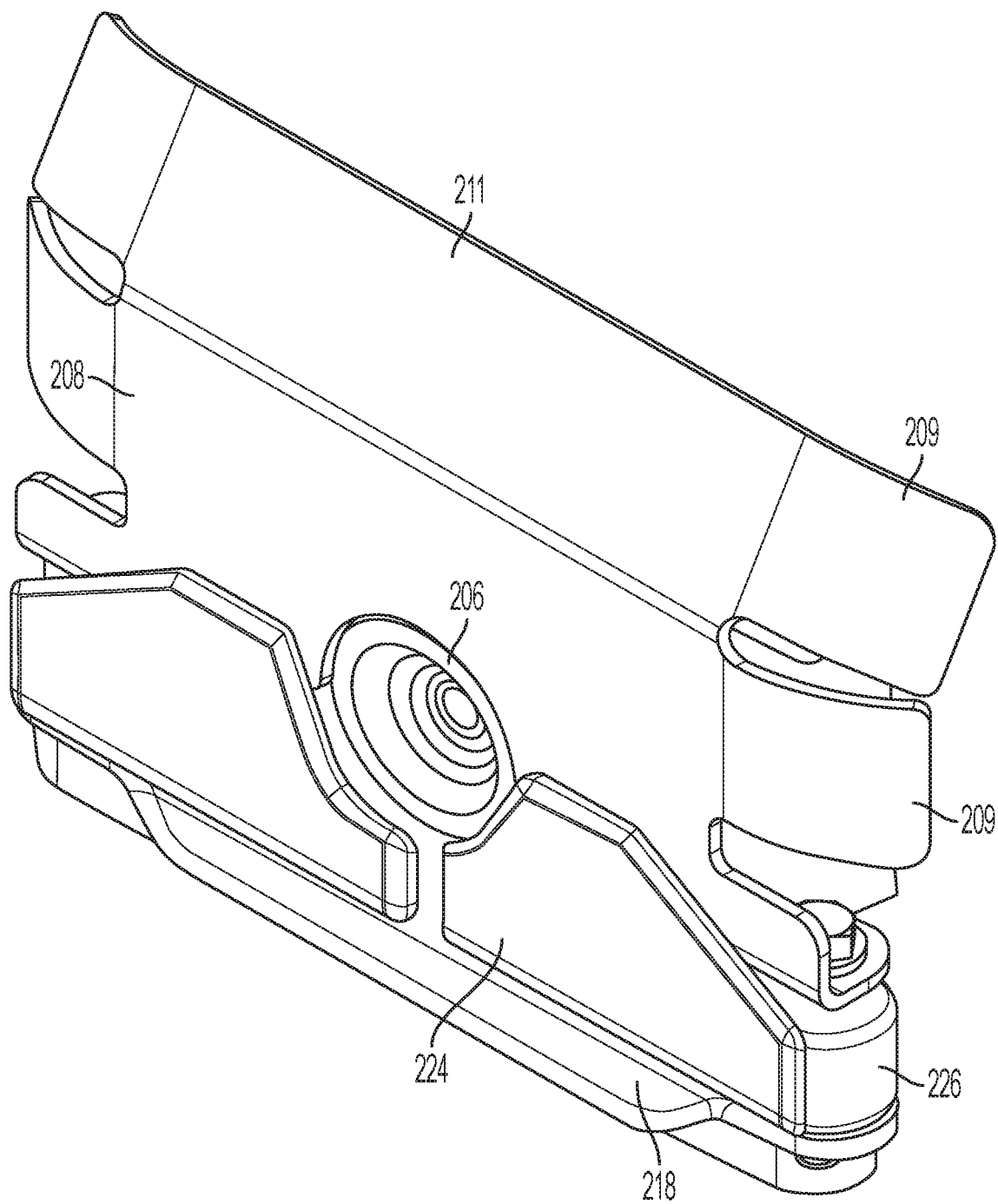
FIG. 10 is a perspective view of the long travel cable carrier guide of FIG. 2 showing the support portion in a retracted position.
Figure 11:
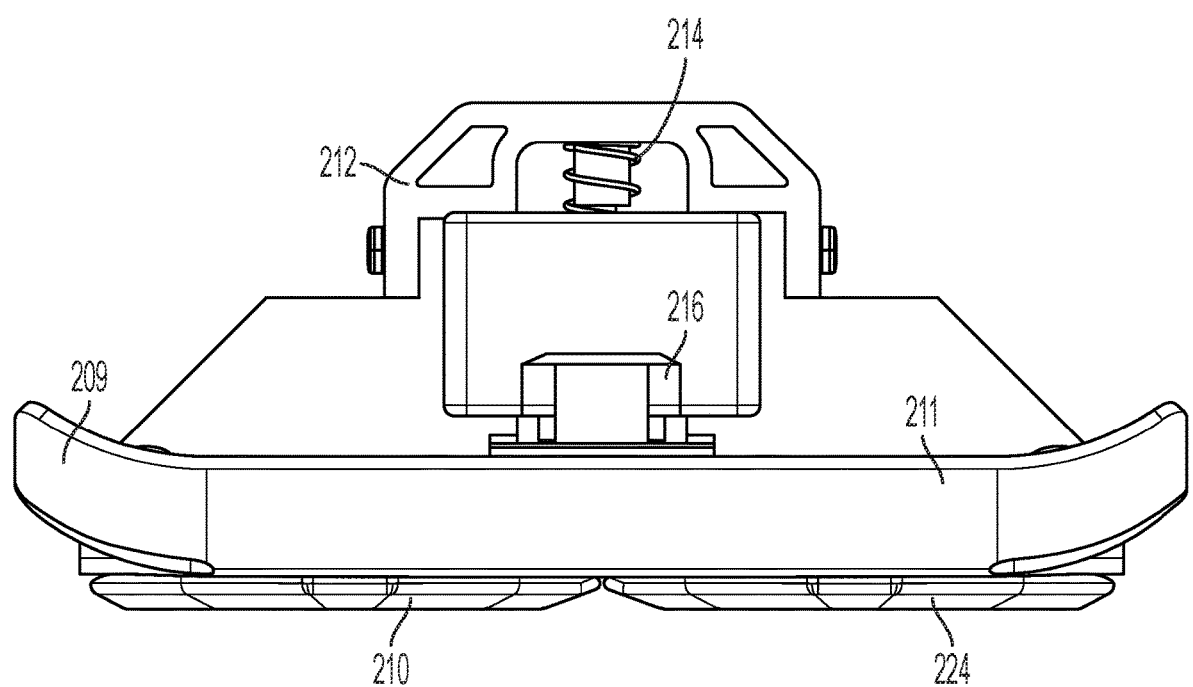
FIG. 11 is a top view of the long travel cable carrier guide of FIG. 2 showing the support portion in the retracted position and with the protective cover removed.
Figure 12:
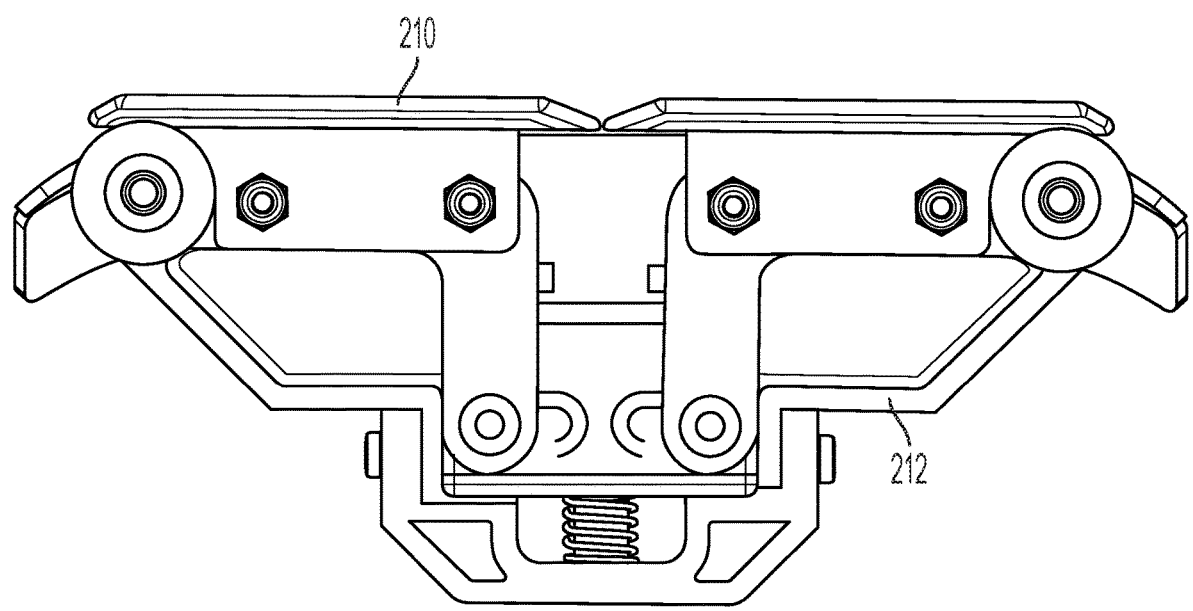
FIG. 12 is a bottom view of the long travel cable carrier guide of FIG. 2 showing the support portion in the extended position with the support base removed.
Figure 13:
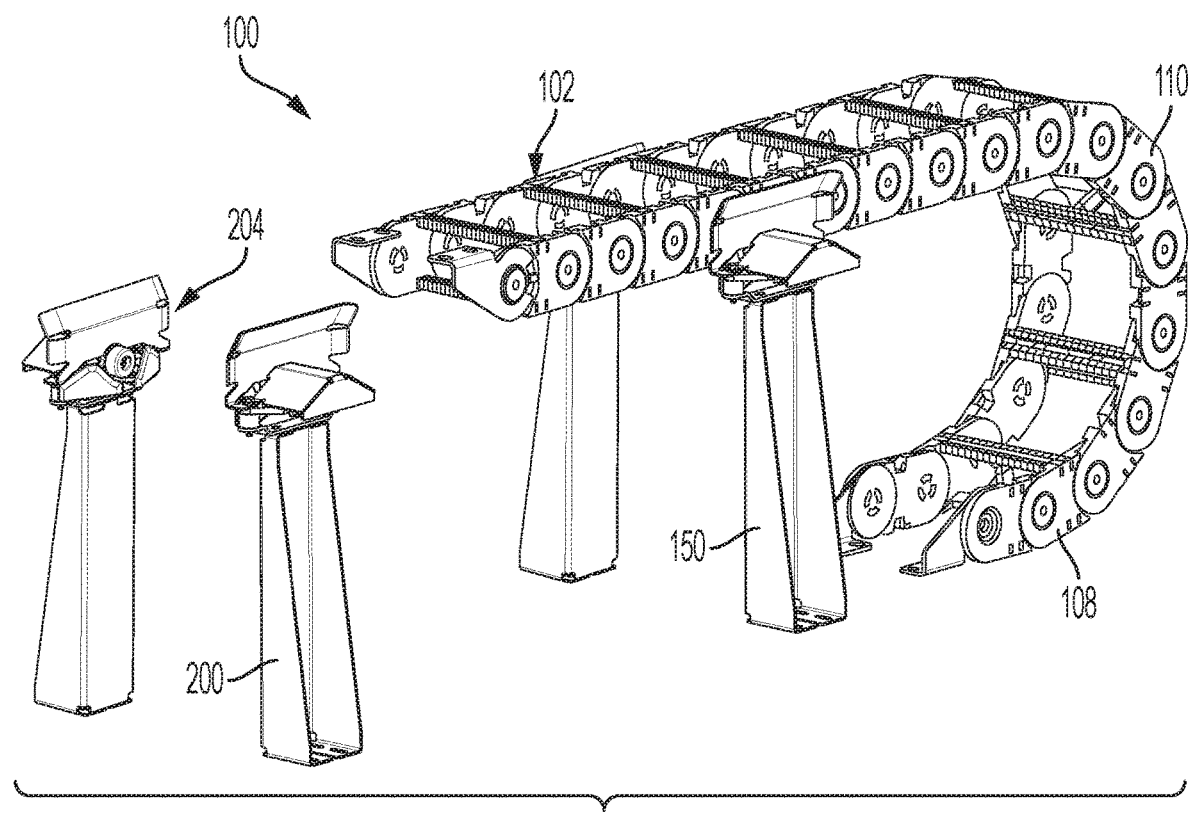
FIG. 13 is another perspective view of the long travel cable carrier guide of FIG. 1.

As shown in FIGS. 7-9, bumper 210 and roller 206 are biased in an extended position by a spring 214. As cable carrier 102 passes guidepost 200, cable carrier 102 engages bumper 210, causing both bumpers and roller 206 to move to a retracted position as shown in FIGS. 10-12. After cable carrier passes guidepost 200, spring 214 causes roller 206 and bumpers 210 to return to the extended position.

As shown, vertical guide 208 further includes a plurality of tabs 209 that are bent slightly away from the horizontal path 105 in order to provide a gradual transition into the guide path and to "catch" the cable carrier 102 if it drifts toward the outside of the path. In addition, vertical guide 208 includes an upper portion 211 that is bent slightly away from the horizontal path 105, which prevents the cable carrier 102 from jumping out of the path, but also minimizing the contact area between the vertical guide and the cable carrier. It is advantageous to minimize the contact area between the vertical guide 208 and the cable carrier 102 because the cable carrier slides next to vertical guide If desired, vertical guide 208 may also include at least one roller to reduce friction between the cable carrier 102 and the vertical guide.

As shown in FIGS. 6-7, vertical guide 208 is removably attached to support base 212 by two bolts 213 and nuts 215, which allows it to be easily replaced. Although nuts and bolts are shown here, vertical guide 208 may be attached to support base 212 by any suitable attachment without departing from the invention. Further, vertical guide 208 may alternatively be integrally formed into support base 212, although doing so would likely decrease the usable life of the support base.

Although the invention has been herein described in what is perceived to be the most practical and preferred embodiments, it is to be understood that the invention is not intended to be limited to the specific embodiments set forth above. Rather, it is recognized that modifications may be made by one of skill in the art of the invention without departing from the spirit or intent of the invention and, therefore, the invention is to be taken as including all reasonable equivalents to the subject matter of the appended claims and the description of the invention herein.

What is claimed is:

1. A guide for a cable carrier that travels along a path, the cable carrier having an upper portion, a middle portion, and a lower portion, the guide comprising:
   a plurality of guideposts positioned on sides of the path;
   each of the plurality of guideposts having a support assembly including least one support roller;
   the support roller slidably attached to the support assembly, the support roller having an extended position and a retracted position in relation to the support assembly, wherein the support roller provides support to the upper portion when the support roller is in the extended position, and the middle portion may pass by the guidepost when the support roller is in the retracted position;
   the support roller biased toward the extended position; and
   a plurality of bumpers positioned near the support roller and rotatably attached to the support assembly such that when the cable carrier approaches the guidepost, the middle portion engages at least one bumper, thereby causing the roller to temporarily move to the retracted position while the middle portion is engaged with the bumper and allowing the middle portion to pass by the guidepost.

2. The guide of claim 1, wherein the support assembly further includes a vertical guide that prevents the cable carrier from moving outside the path.

3. The guide of claim 1, wherein the bumpers further include substantially flat bumper pads removably attached to the support assembly.

4. The guide of claim 1, wherein the support roller is biased toward the extended position by a spring.

5. The guide of claim 1, wherein the bumpers include bushings allowing the bumpers to rotate with respect to the support assembly.

6. A guidepost for a cable carrier guide, the guidepost comprising:
   a base;
   a support assembly including least one support roller;
   the support roller slidably attached to the support assembly, the support roller having an extended position and a retracted position in relation to the support assembly;
   the support roller biased toward the extended position; and
   a plurality of bumpers positioned near the support roller and rotatably attached to the support assembly such that when the cable carrier approaches the guidepost, the middle portion engages at least one bumper, thereby causing the roller to temporarily move to the retracted position while the middle portion is engaged with the bumper and allowing the middle portion to pass by the guidepost.

7. The guidepost of claim 6, wherein the support roller is biased toward the extended position by a spring.

8. The guidepost of claim 6, wherein the support assembly further includes a vertical guide that prevents the cable carrier from moving outside the path.

9. The guidepost of claim 6, wherein the bumpers further include substantially flat bumper pads removably attached to the support assembly.

10. The guidepost of claim 6, wherein the bumpers include bushings allowing the bumpers to rotate with respect to the support assembly.

11. The guidepost of claim 6, wherein the bumpers include replaceable bumper pads.

* * * * *

UNITED STATES PATENT AND TRADEMARK OFFICE
CERTIFICATE OF CORRECTION

PATENT NO. : 10,724,657 B2  
APPLICATION NO. : 16/242711  
DATED : July 28, 2020  
INVENTOR(S) : Jay O'Brien Page 1 of 1

It is certified that error appears in the above-identified patent and that said Letters Patent is hereby corrected as shown below:

On the Title Page

Item (60), the number "62/614,896" should replace the number "61/614,896"

In the Specification

Column 1 Line 7, the number "62/614,896" should replace the number "61/614,896"

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*